United States Patent [19]

Bando

[11] Patent Number: 5,283,505
[45] Date of Patent: Feb. 1, 1994

[54] AUTO SCAN HORIZONTAL DEFLECTION APPARATUS

[75] Inventor: Takahiro Bando, Nagasaki, Japan

[73] Assignee: Mitsubishi Denki Kabushiki Kaisha, Tokyo, Japan

[21] Appl. No.: 857,506

[22] Filed: Mar. 25, 1992

[30] Foreign Application Priority Data

Apr. 24, 1991 [JP] Japan .................... 3-119165

[51] Int. Cl.⁵ .............. H01J 29/70; G09G 1/04; H04N 5/63
[52] U.S. Cl. .................. 315/411; 315/387; 348/730
[58] Field of Search ........... 315/387, 408, 411, 371; 358/190

[56] References Cited

U.S. PATENT DOCUMENTS

| | | | |
|---|---|---|---|
| 4,574,224 | 3/1986 | Nowaczyk | 315/408 |
| 4,677,350 | 6/1987 | Wharton et al. | 315/371 |
| 4,679,211 | 7/1987 | Kurz | 315/399 |
| 4,789,811 | 12/1988 | Hulshof | 315/408 |
| 4,829,414 | 5/1989 | Yook | 315/408 |
| 4,900,988 | 2/1990 | Yuk | 315/411 |
| 4,958,110 | 9/1990 | Hayase | 315/408 |
| 5,023,523 | 6/1991 | Tomita | 315/364 |

FOREIGN PATENT DOCUMENTS 1235822 4/1988 Canada.

OTHER PUBLICATIONS

*Patent Abstracts of Japan*, vol. 11, No. 346, (JP 62-126775), Nov. 1987.

Primary Examiner—Gregory C. Issing
Attorney, Agent, or Firm—Burns, Doane, Swecker & Mathis

[57] ABSTRACT

An auto scan horizontal deflection apparatus comprising a voltage detecting circuit as an amplitude detecting winding arranged at a secondary side of a choke transformer and detects amplitude of a flyback pulse. A frequency discriminating circuit (frequency/voltage converting circuit) discriminates frequency of horizontal synchronizing signal, and a control signal generating circuit (adding circuit) generates a control signal controlling the power source voltage of a variable power circuit supplying a power source voltage to a horizontal output circuit through a primary winding of the choke transformer on the basis of the outputs of both circuits. It becomes possible for the apparatus to keep horizontal deflection width constant regardless of the horizontal deflection frequency without using a conventionally-used detection resistance whose electric power loss is large, thereby decreasing electric power loss and keeping the horizontal amplitude almost constant even when the horizontal deflection frequency is changed.

6 Claims, 5 Drawing Sheets

AUTO SCAN HORIZONTAL DEFLECTION APPARATUS

BACKGROUND OF THE INVENTION

1. Field of the Invention

This invention relates to an auto scan horizontal deflection apparatus cable of obtaining constant, horizontal amplitude even when the horizontal deflection frequency is changed.

2. Description of the Related Art

FIG. 1 is a block diagram showing a conventional auto scan horizontal deflection apparatus disclosed, for example, in Japanese Utility Model Application Laid-Open No. 63-56865 (1988). In the figure, reference numeral 1 designates a horizontal oscillation driving circuit to which a horizontal synchronizing signal is inputted from an exterior image apparatus through an input terminal IT, and numeral 2 designates a horizontal output circuit (driven by the output of the horizontal oscillation driving circuit 1.

In the horizontal output circuit 2, the symbol Q designates a switching transistor which is switched by the output of the horizontal oscillation driving circuit 1, and D1 designates a damper diode thereof. The symbol L designates a horizontal deflection coil, and C designates a resonance capacitor connected with the horizontal deflection coil L in parallel.

In addition, a plurality of dummy coils Ld, each of which can be short-circuited by a switch S1, are connected in series with the horizontal deflection coil L, and a plurality of dummy capacitors Cd, each of which is grounded at its one end through a switch S2, are connected in parallel with the resonance capacitor C.

Symbol Cs designates an S-form compensation capacitor connected in series with the horizontal deflection coil L, and R designates a detection resistance connected in series with the S-form compensation capacitor Cs in order to detect horizontal deflection current I flowing through the horizontal deflection coil L.

Reference numeral 3 designates a peak rectifier circuit which detects voltage drop between both of the terminals of across the detection resistance R, and 4 designates a variable power circuit in which a source voltage Vcc to be outputted is controlled with the output voltage of the peak rectifier circuit 3 being used as control signal.

Reference numeral 5 is a choke transformer supplying the source voltage Vcc to the horizontal output circuit 2 through a primary winding 5a from the variable power circuit 4, and a high-voltage output is outputted from a secondary winding 5b thereof through a diode Db.

Reference numeral 6 is a deflection mode switching circuit controlling opening/closing of the switches S1 and S2 inside of the horizontal output circuit 2, responsive to the frequency of title inputted horizontal synchronizing signal Next, an explanation will be given of the operation of the circuit shown in FIG. 1. A plurality of dummy windings Ld which can optionally be short-circuited by the switch S1 are connected in series with the horizontal deflection coil L so that the power voltage Vcc of the horizontal output circuit 2 is not changed greatly when the frequency of the inputted horizontal synchronizing signal is changed.

In addition, at the resonance capacitor C, a plurality of dummy capacitors Cd are connected in parallel, each of whose one end being grounded respectively by the switch S2 so that the ratio Ts/Tr of the horizontal scanning time Ts to the horizontal flyback time Tr may be kept almost constant by changing the horizontal flyback time Tr.

These switches S1, S2 are switched according to frequencies of the inputted horizontal synchronizing signals of a television system (15 to 17 KHz), high density personal computer system (22 to 26 KHz), high density CAPTAIN (Character and pattern telephone access information network:videotex) system (29 to 34 KHz) and so on by the deflection mode switching circuit 6.

By the way, of background horizontal width of an image projected on a picture tube is decided by the horizontal deflection current I when the anode voltage of the picture tube is constant. The relation between the horizontal deflection current I and the source voltage Vcc of the horizontal output circuit 2 is shown in the following equation (1).

$$I = Vcc \cdot \frac{Ts}{L + Ld} \qquad (1)$$

Accordingly, variation of the horizontal width can be limited to a certain extent by changing the net inductance L+Ld including the horizontal deflection coil L at the horizontal scanning time Ts is changed with the horizontal deflection frequency. In order to make the horizontal width constant usually, however, it is required to control the source voltage Vcc by detecting the horizontal deflection current I.

Therefore, the detection resistance R is connected with the S-form compensation capacitor Cs and the voltage drop across this detection resistance R is detected by the peak rectifier circuit 3. The variable voltage circuit 4 is then controlled so that the value of the detected voltage drop may be constant, thereby adjusting the source voltage Vcc outputted therefrom.

In addition, as another prior art, the invention of Japanese Patent Application Laid-Open No. 62-5781 (1987), entitled as "a deflection circuit" has been proposed. The invention of this Japanese Patent Application Laid-Open No. 62-5781 (1987) is so constructed as to carry out almost a constant horizontal deflection by changing the electric source potential of the horizontal output circuit to be saw toothlike responsive to the input frequency of the horizontal synchronizing signal.

As a conventional auto scan horizontal deflection apparatus is so constructed as above-mentioned, in the former, electric power is largely lost according to the detection resistance R, and the deflection current I becomes large especially when a large-sized monitor is used, therefore electric power loss becomes great and cannot be neglected, these facts causing the apparatus to be an impractical one.

The latter arrangement has a possibility that the horizontal scan width changes when the input frequency of the horizontal synchronizing signal changes. Because it does not carry out feedback of the horizontal scan width.

SUMMARY OF THE INVENTION

The present invention has been devised in such circumstances, and the primary object thereof is to provide an auto scan horizontal deflection apparatus in which power loss is small and horizontal width becomes almost constant even when the horizontal deflection frequency changes linearly.

The auto scan horizontal deflection apparatus related to the invention is provided with a voltage detecting circuit which is connected with a detecting winding arranged at the secondary side of choke transformer and which detects the amplitude of a flyback pulse. A frequency discriminating circuit which discriminates frequencies of a horizontal synchronizing signal and a control signal generating circuit, generates a control signal for controlling a source voltage of variable power circuit which supplies a source voltage to a horizontal output circuit through a primary winding of the choke transformer on the basis of the outputs of the voltage detecting circuit and the frequency discriminating circuit.

The auto scan horizontal deflection apparatus of the invention regulates source voltage to be supplied to the horizontal output circuit by feed back to the variable power circuit a voltage based on a magnitude of a flyback pulse induced at the detecting winding arranged at secondary side of the choke transformer between the variable power circuit and the horizontal output circuit combined with a voltage obtained by frequency/voltage converting the horizontal deflection frequency, so that horizontal deflection width is kept constant, regardless of the horizontal deflection frequency and only a slight loss of electric power, so that the horizontal width thereof becomes almost constant even when the horizontal deflection frequency changes.

The above and further object is and features of the invention will more fully be apparent from the following detailed description with accompanying drawings.

DESCRIPTION OF THE PREFERRED EMBODIMENTS

Embodiment 1

Figure 1:
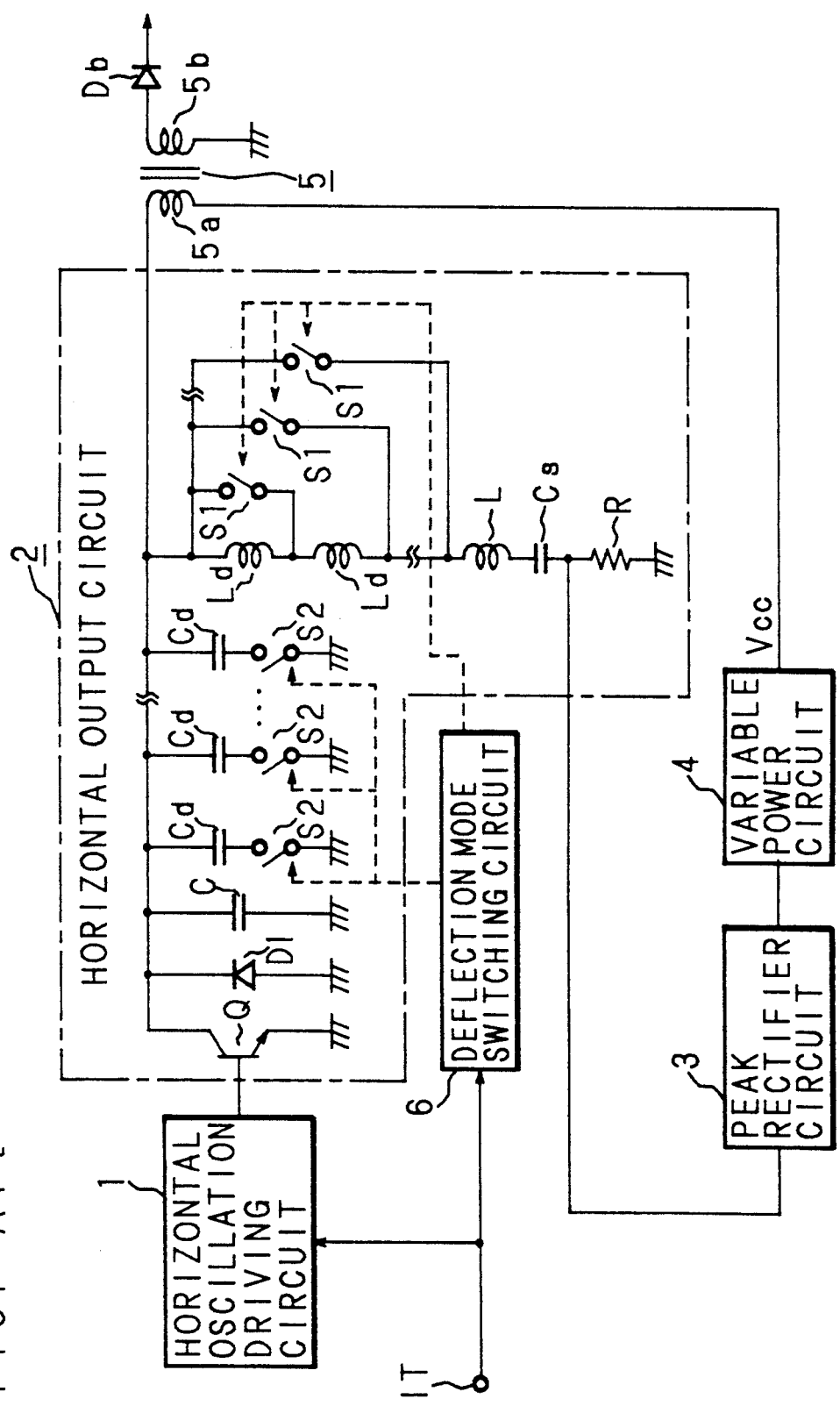
FIG. 1 is a block diagram showing a construction of Japanese Utility Model Application Laid-Open No. 63-56865 (1988) as a conventional example.
Figure 2:
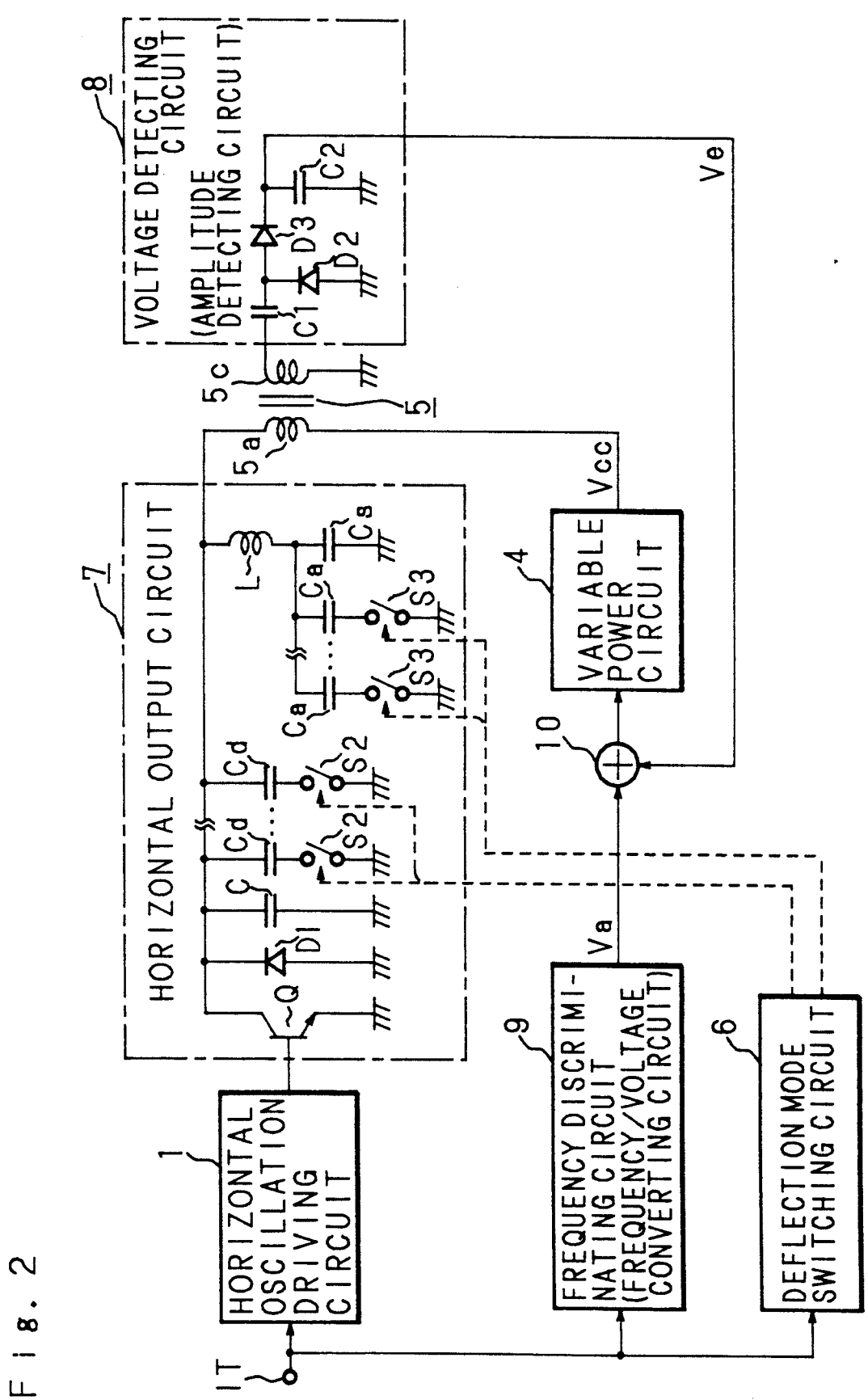
FIG. 2 is a block diagram showing a construction of one embodiment of the auto scan horizontal deflection apparatus of the invention.

In the following, explanation will be given on one embodiment of the invention referring to drawings. In FIG. 2, reference numeral 1 designates a horizontal oscillation driving exhibit, 4 designates a variable power circuit, 5 a choke transformer, 6 a deflection mode switching circuit, Q a switching transistor, D1 a damper diode, L a horizontal deflection coil, C a resonance capacitor, S2 a switch, Cd a dummy capacitor, and Cs designates an S-form compensation capacitor. Explanation of these elements will be omitted, for they are same or corresponding to conventional elements having the same symbols in FIG. 1.

In addition, Ca designates a plurality of adjusting capacitors connected in parallel with the aforesaid S-form compensation capacitor Cs, S3 is a switch grounding the adjusting capacitors Ca selectively, and numeral 7 designates a horizontal output circuit being different from the conventional one in that the dummy winding Ld, switch S1 and detection resistance R are removed and the aforesaid adjusting capacitor Ca and switch S3 are added.

Numeral 8 designates a voltage detecting circuit as an amplitude detecting circuit which is connected with a detecting winding 5c arranged at the secondary side of the aforesaid choke transformer 5, rectifies a flyback pulse inducted by the detecting winding 5c by diodes D2, D3 and capacitor C1, C2 and outputs a detecting voltage Ve responsive to the amplitude thereof.

Figure 3:
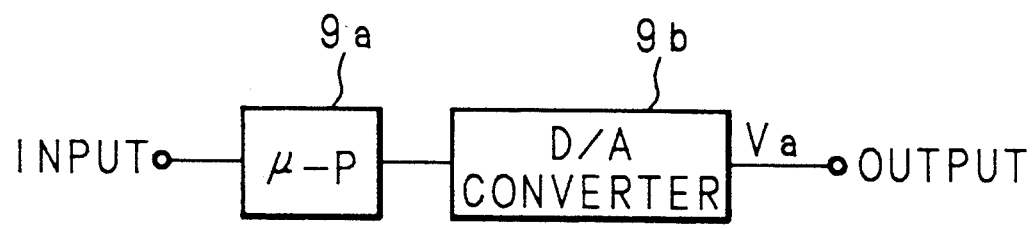
FIG. 3 is a block diagram showing a construction example of a frequency discriminating circuit thereof.

Numeral 9 designates a frequency/voltage converting circuit as a frequency discriminating circuit which discriminates the frequency of the horizontal synchronizing signal inputted through an input terminal IT. The frequency/voltage converting circuit 9, as shown in, for example, FIG. 3, is composed of a microprocessor ($\mu$-P) 9a and a digital/analog converter (hereinafter, to be called a D/A converter) 9b, and converts by the D/A converter 9b a voltage value based on frequency of horizontal synchronizing signal calculated by the micro-processor 9a into an analog voltage Va and outputs it.

Numeral 10 designates an adding circuit as a control signal generating circuit generating control signals of the aforesaid variable power circuit 4 on the basis of the outputs of the voltage detecting circuit 8 and the frequency/voltage converting circuit 9, the detecting voltage Ve of the voltage detecting circuit 8 and the output voltage Va of the frequency/voltage converting circuit 9 being added therein.

Next, explanation will be given on the operation of the circuit just described. The flyback pulse induced by the detecting winding 5c arranged at the secondary side of the choke transformer 5 is rectified by the voltage detecting circuit 8 by the diodes D2, D3 and capacitors C1, C2 to obtain the detecting voltage Ve. The detecting voltage Ve and the horizontal deflection current I are respectively shown by the following equations (2) and (3).

$$Ve = K \cdot \frac{\pi}{2} \cdot \frac{Ts}{Tr} \cdot Vcc \quad (2)$$

$$I = Vcc \cdot \frac{Ts}{L} \quad (3)$$

Here, K designates a proportional constant, Ts and Tr respectively designate horizontal scanning time and horizontal flyback time, Vcc the power source voltage of the horizontal output circuit 7 and the inductance of the horizontal deflection coil L. According to the above equations (2) and (3), the horizontal deflection current I and the detecting voltage Ve has a relation shown by the following equation (4).

$$I = Vcc \cdot \frac{Ts}{L} = \frac{Tr \cdot Ve}{K \cdot (\pi/2) \cdot L} \quad (4)$$

Here, since the denominator of this equation is constant, when the horizontal flyback time Tr is constant, that is, with a horizontal frequency corresponding to the positions of the switches S2, when the detecting voltage Ve is made constant, it is understood that the horizontal deflection current I constant. In order to make this detecting voltage Ve constant, it is preferable to make the detecting voltage Ve feedback to the variable power circuit 4.

Figure 4:
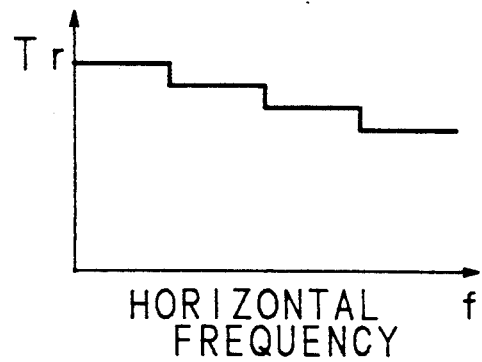
FIG. 4 is a graph showing change of horizontal flyback time to horizontal frequency according to an auto scan horizontal deflection apparatus of the invention.
Figure 5:
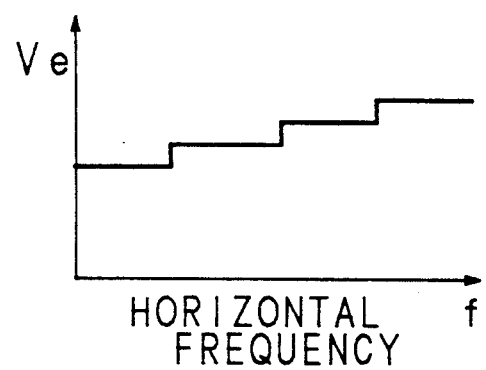
FIG. 5 is a graph showing change of detecting voltage of a voltage detecting circuit similarly to horizontal frequency.
Figure 6:
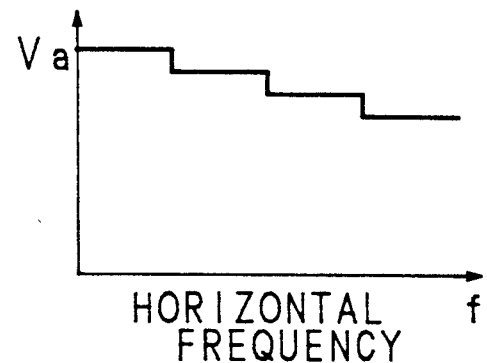
FIG. 6 is a graph showing change of output voltage of a frequency/voltage converting circuit similarly to horizontal frequency.

Next, in the case where the horizontal flyback time Tr is changed, it is preferable to cause the detecting voltage Ve to change to be inversely proportional to the horizontal flyback time Tr. That is, in the case where the horizontal flyback tame Tr changes to the horizontal frequency as shown in FIG. 4, it is preferable to make the detecting voltage Ve of the voltage detecting circuit 8 change as shown in FIG. 5. In order to do that, it is preferable to make the output voltage Va of the frequency/voltage converting circuit 9 as shown in FIG. 6.

Accordingly, the microprocessor 9a of the frequency/voltage converting circuit 9 is made to perform a calculation which outputs a data shown in FIG. 5 to frequency of inputted synchronizing signal and the calculated result is converted into analog voltage by the D/A converter 9b to generate output voltage Va.

The output voltage Va of the frequency/voltage converting circuit, 9 and the detecting voltage Ve of the aforesaid voltage detecting circuit 8 are added by the adding circuit 10 and inputted as control signal to the variable power circuit 4 to adjust the power source voltage Vcc to be supplied to the horizontal output circuit 7 from the variable power circuit 4.

Embodiment 2

Figure 7:
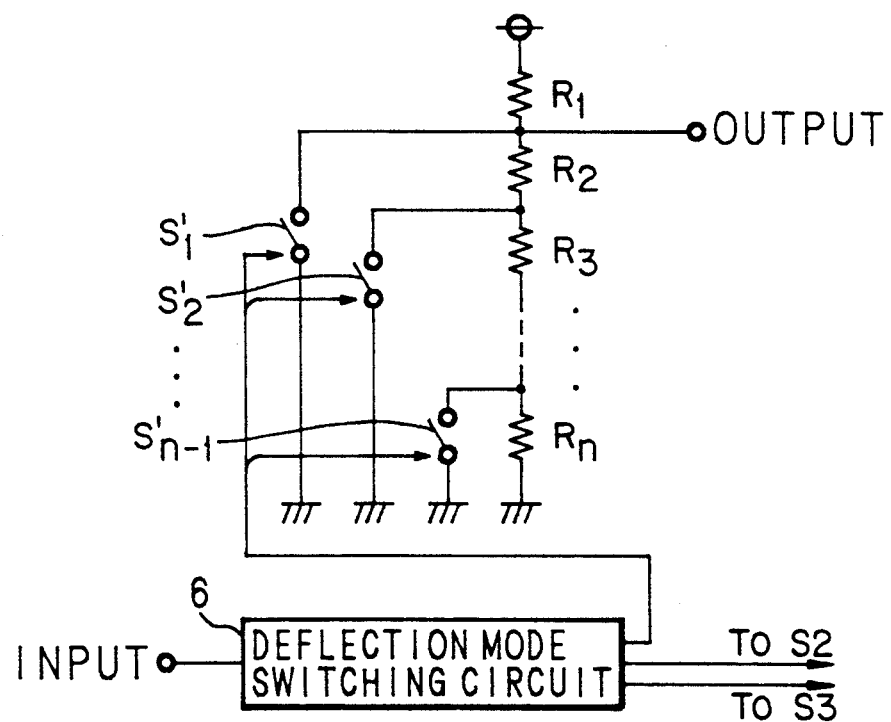
FIG. 7 is a circuit diagram showing construction of a frequency/voltage converting circuit of another embodiment of the invention.

In addition to the above embodiment, in which frequency/voltage converting circuit 9 is composed of a micro-processor 9a and the D/A converter 9b as shown, the frequency/voltage converting circuit may alternatively be composed of a circuit such as that shown in FIG. 7 wherein, for example, resistances R1, R2, ... Rm connected in series are selectively grounded by switches S'1, S'2, ... S'n-1, each of which is opened or closed according to the output of the deflection mode switching circuit 6. This arrangement is also preferable, being as effective as the above embodiment.

As above-mentioned, according to this invention, since a voltage based on the amplitude of a flyback pulse induced at the detecting winding arranged at the secondary side of the choke transformer between the variable power circuit and the horizontal output circuit along with a voltage obtained by frequency/voltage converting a signal based on the horizontal deflection frequency is fed back to the variable power circuit so as to adjust power source voltage to be supplied to the horizontal output circuit, it becomes possible to maintain the horizontal deflection width constant regardless of the horizontal deflection frequency. Thereby it is possible to obtain auto scan horizontal deflection apparatus with low electric power loss and whose horizontal amplitude is almost constant even when horizontal deflection frequency is changed.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An auto scan horizontal deflection apparatus, comprising:
    a variable power circuit which outputs a voltage controlled by a control signal as a power source voltage;
    a horizontal output circuit which has a choke transformer, is supplied with power source voltage from said variable power circuit through a primary winding of said choke transformer, and is driven by an externally-applied horizontal synchronizing signal;
    an amplitude detecting circuit which detects an amplitude of a flyback pulse induced at a detecting winding arranged at a secondary side of said choke transformer;
    a frequency discriminating circuit which discriminates a frequency of said horizontal synchronizing signal; and
    a control signal generating circuit which generates the control signal for said variable power circuit on the basis of outputs of said amplitude detecting circuit and said frequency discriminating circuit.

2. An auto scan horizontal deflection apparatus as set forth in claim 1, wherein said amplitude detecting circuit is a voltage detecting circuit which detects the amplitude of the flyback pulse induced at the detecting winding arranged at the secondary side of said choke transformer as a voltage.

3. An auto scan horizontal deflection apparatus as set forth in claim 1, wherein said frequency discriminating circuit comprises:
    a microprocessor which calculates the frequency of the inputted horizontal synchronizing signal; and
    a digital/analog converter which outputs an analog voltage signal on the basis of frequency calculated by said microprocessor.

4. An auto scan horizontal deflection apparatus as set forth in claim 1, wherein said frequency discriminating circuit comprises:
    a deflection mode switching circuit which outputs different signals according to frequencies of the inputted horizontal signal;
    a resistance circuit in which a plurality of resistances are connected in series between a power source potential and earth potential; and
    a plurality of switches, each of which has one end connected with a respective node between each of the resistances of said resistance circuit and another end connected with the earth potential, being on/off controlled respectively by outputs being different from each other of said deflection mode switching circuit;
    whereby a voltage signal responsive to the output of said deflection mode switching circuit is outputted from said resistance circuit in the case where any of said plurality of switches are on corresponding to the output of said deflection mode switching circuit.

5. An autoscan horizontal deflection apparatus comprising:
    a horizontal output circuit driven by a horizontal synchronizing signal;
    a choke transformer including a primary winding and a detecting winding provided on a secondary side of said choke transformer, said primary winding being connected to said horizontal output circuit;

an amplitude detecting circuit, connected to said detecting winding, for detecting an amplitude of a flyback pulse produced in said detecting winding and for producing a first signal indicative of the detected amplitude;

a frequency discriminating circuit arranged to receive said horizontal synchronizing signal, for producing a second signal based on a frequency of said horizontal synchronizing signal;

means, responsive to said amplitude detecting circuit and said frequency discriminating circuit, for generating a control signal on the basis of said first signal and said second signal; and means, responsive to said control signal generating means and connected to said horizontal output circuit through said primary winding, for supplying operating voltage to aid horizontal output circuit through said primary winding in accordance with said control signal.

6. An autoscan horizontal deflection apparatus as set forth in claim 5, wherein said frequency discrimination circuit comprises a first, second, and third resistor connected in series between a supply voltage and ground;

a first switch arranged to connect a junction of said first resistor and second resistor to ground when closed;

a second switch arranged to connect a junction of said second resistor and third resistor to ground when closed; and means, connected to said first switch and said second switch, for causing said first switch to be open or closed and said second switch to be open or closed according to a frequency of said horizontal synchronizing signal, said second output signal being produced at said junction of said first and second resistors.

* * * * *